United States Patent [19]
Minn et al.

[11] Patent Number: 6,088,347
[45] Date of Patent: Jul. 11, 2000

[54] VARIABLE CHIP RATE CODE-DIVISION MULTIPLE ACCESS

[75] Inventors: Thit Minn, Boston; Kai-Yeung S. Siu, Charlestown, both of Mass.

[73] Assignee: Massachusetts Institute of Technology, Cambridge, Mass.

[21] Appl. No.: 09/266,160

[22] Filed: Mar. 10, 1999

Related U.S. Application Data

[60] Provisional application No. 60/100,350, Sep. 15, 1998, and provisional application No. 60/115,335, Jan. 11, 1999.

[51] Int. Cl.$^7$ .................................................. H04B 7/216
[52] U.S. Cl. .......................... 370/342; 370/441; 375/146
[58] Field of Search ................................... 370/209, 320, 370/335, 342, 441, 208; 375/200, 206, 208, 140, 146

[56] References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,228,054 | 7/1993 | Rueth et al. | 375/1 |
| 5,414,728 | 5/1995 | Zehavi | 375/200 |
| 5,414,796 | 5/1995 | Jacobs et al. | 395/2.3 |
| 5,442,625 | 8/1995 | Gitlin et al. | 370/18 |
| 5,703,874 | 12/1997 | Schilling | 370/335 |
| 5,751,761 | 5/1998 | Gilhousen | 375/200 |
| 5,777,990 | 7/1998 | Zehavi et al. | 370/335 |
| 5,790,588 | 8/1998 | Fukawa et al. | 370/342 |
| 5,856,971 | 1/1999 | Gitlin et al. | 370/335 |
| 5,881,056 | 3/1999 | Huang et al. | 370/342 |

OTHER PUBLICATIONS

Wyrwas, R. et al., "Multiple Access Options for Multi–Media Wireless Systems," Signal Processing Research Institute, pp. 289–294.

Karol, M. J. et al., "Time–Frequency–Code Slicing: Efficiently Allocating the Communications Spectrum to Multirate Users," IEEE Transactions on Vehicular Technology, vol. 46, No. 4, pp. 818–825, Nov. 1997.

I, C. –L. et al., "IS–95 Enhancements for Multimedia Services," Bell Labs Technical Journal, pp. 60–85, Autumn 1996.

Adachi, F. et al, "Tree–structured generation of orthogonal spreading codes with different lengths for forward link of DS–CDMA mobile radio," Electronics Letters, vol. 33, No. 1, pp. 27–28, Jan. 2, 1997.

I, C. –L. and Sabnani, K.K., "Variable Spreading Gain CDMA with Adaptive Control for True Packet Switching Wireless Network," pp. 725–730.

Dahlman, et al., "UMTS/IMT–2000, Based on Wideband CDMA," IEEE Communications Magazine, pp. 70–80, Sep. 1998.

*Primary Examiner*—Joseph L. Felber
*Attorney, Agent, or Firm*—Hamilton, Brook, Smith & Reynolds, P.C.

[57] ABSTRACT

A method of communicating multiple signals over a common communications link by modulating first input signals with respective first codes of low cross-correlation to obtain a first set of modulated signals at a first chip rate. The input signals can be, for example, digitized audio or video signals, or data signals. The second input signals are of a data rate higher than the first input signals, and the second codes are of a dimension greater than the first codes. The second input signal or signals are modulated with respective second codes of low cross correlation relative to each other and relative to the first codes, resulting in a second set of modulated signals at a second chip rate such that there is spectral overlap between the first and second sets of modulated signals. The first and second sets of modulated signals are preferably modulated with different noise signals to spread the spectrum of each. In a preferred embodiment, the first and second codes are Walsh codes of different dimensions.

41 Claims, 10 Drawing Sheets

VCR-CDMA + VSG-CDMA
rate 4R
c[n]=[1011] W(2,2)=[10]

FIG. 12A

VSG-CDMA
rate 2R
c[n]=[1011] W(2,2)=[10]

FIG. 12B
(PRIOR ART)

VCR-CDMA
c[n]=[1011]
rate 2R
W(4,4)=[1001]

VARIABLE CHIP RATE CODE-DIVISION MULTIPLE ACCESS

RELATED APPLICATION

This application claims priority to U.S. Provisional Application No. 60/100,350, filed Sep. 15, 1998, and U.S. Provisional Application No. 60/115,335 filed Jan. 11, 1999, the entire teachings of which are incorporated herein by reference.

BACKGROUND OF THE INVENTION
Wireless Digital Communication System

Figures 1, 2:
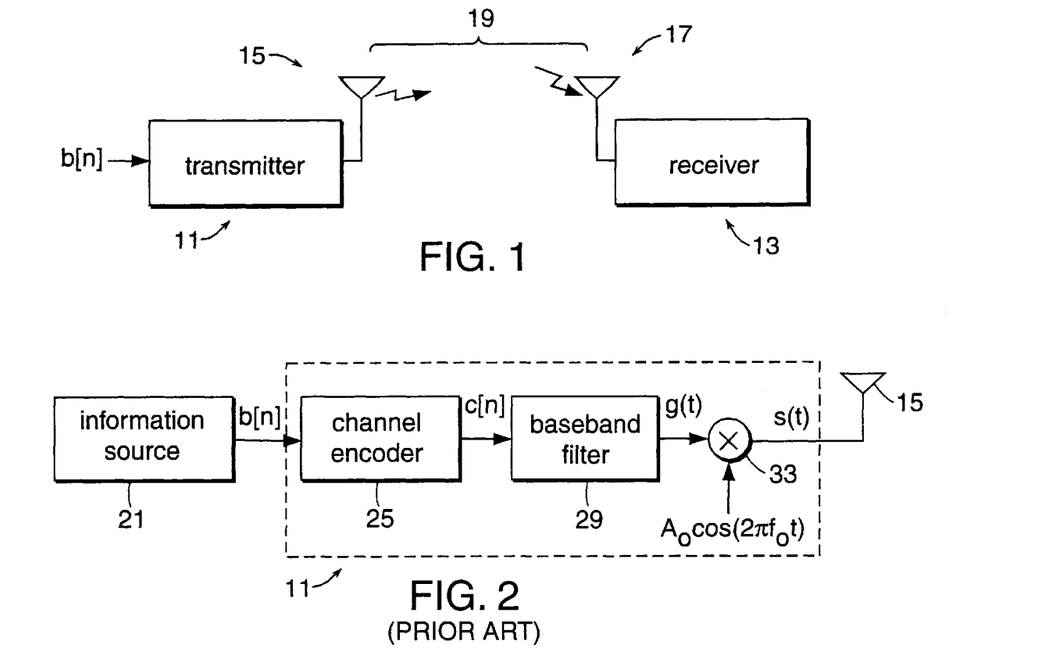
FIG. 1 is a block diagram illustrating a wireless digital communication system.
FIG. 2 illustrates a generalized binary phase-shift keying (BPSK) transmitter of a digital communication system.

FIG. 1 is a block diagram of a digital wireless communication system. An information sequence b[n], which could be, for example, speech, a data file, video, etc., is first processed in the transmitter unit 11 and converted to radio signals which are radiated via an antenna 15 over a wireless medium or channel 19. The channel 19 is the free space medium through which the radiated radio signals traverse before reaching the antenna 17 of a receiver unit 13. The receiver 13 performs the inverse operation of the transmitter 11, that is, it converts the detected radio signals into an information sequence intelligible to a user at the receiving end.

FIG. 2 is a block diagram of the transmitter 11 of FIG. 1. An information source 21 provides a binary sequence b[n], for example [01001100. . . ], where each 0 or 1 represents one bit of information. The sequence may originate, for example, from a digitized audio/video signal or a data file. $R_b$, the rate at which bits are generated by the information source 21, is defined as the information data rate, or simply, raw bit rate and is measured in bits per second, or bps. The raw bit interval $T_b$, measured in seconds, is the reciprocal of $R_b$, i.e., $T_b=1/R_b$.

To combat noise and other disturbances of a wireless channel, a channel encoder 25 adds redundancy to the information sequence b[n]. The channel encoder 25 outputs a sequence c[n] comprising channel coded data bits, or simply coded data bits.

The code rate r of the channel encoder is equal to k/m, where m is the number of coded data bits corresponding to k information bits during one unit interval. Thus, R, the rate of the channel encoder's output stream c[n], is $R_b/r$. Since, due to redundancy added by the channel encoder, m>k, the coded data bit rate R is always larger than the information rate $R_b$ by a factor of 1/r. The coded data bit interval T is the reciprocal of R, i.e. T=1/R.

The baseband filter 29 shapes each coded data bit of the sequence c[n] into an analog waveform g(t) with a particular pulse shape, for example, a half-cycle of a sinusoidal waveform with amplitude of either +1 or −1, depending on the value of the coded data bits, or equivalently, with a phase of either 0 or π.

The final stage of a transmitter is the carrier modulator 33, or up-converter, which modulates g(t) with a sinusoidal carrier signal $A_o\cos(2\pi f_o t)$ where $A_o$ is the amplitude and $f_o$ is the RF carrier frequency. In cellular systems, $f_o$ is typically in the range of 900 MHz and 1900 MHz. The resulting transmitted signal s(t) is $$s(t)=g(t)A_o\cos(2\pi f_o t)$$

This type of modulation, where each binary digit of an input sequence is mapped to one of two carrier phases, is known as binary phase-shift keying (BPSK).

Figure 3A:
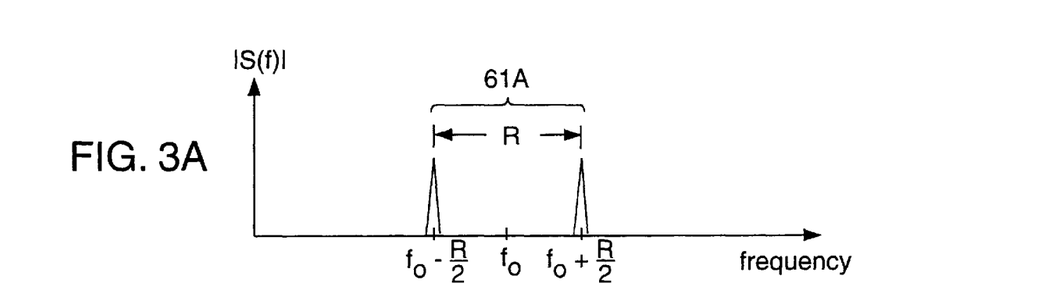
FIGS. 3A and 3B are graphs comparing the transmission bandwidths of a non-spread digital communication system using BPSK and quadri-phase shift keying (QPSK) modulation, respectively.

FIG. 3A shows the amplitude spectrum |S(f)| of BPSK-modulated signal s(t) for a coded sequence in which data bits are alternating 1s and 0s, i.e., c[n]=[ . . . 101010 . . . ] at rate R bps. The transmission bandwidth 61A of s(t) is approximately equal to R, the coded data bit rate.

A similar but more effective modulation system, known as quadri-phase-shift keying (QPSK), maps every two binary digits of the input sequence to one of four carrier phases, e.g. $\theta=\pi/4, 3\pi/4, -3\pi/4, -\pi/4$.

Figure 3B:
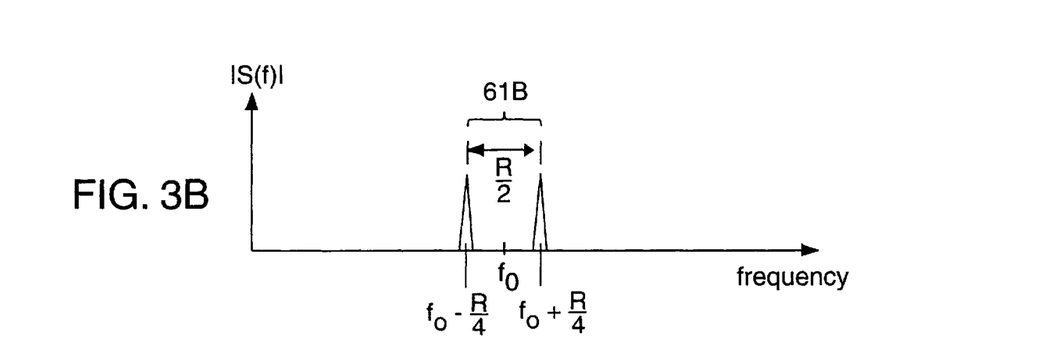

FIG. 3B shows the amplitude spectrum |S(f)| of QPSK-modulated signal s(t) corresponding to the same alternating sequence as in FIG. 3A. The transmission bandwidth 61B is now R/2, half the bandwidth used by the BPSK system of FIG. 3A. Thus, by using QPSK modulation instead of BPSK, the binary data b[n] can be transmitted at a rate of $2R_b$ bps in a given bandwidth since each branch (in-phase or quadrature) modulates its data at a rate of $R_b$ bps. In actual practice, the coded bit rate is less than 2B bps.

Variations of the QPSK modulation scheme have been adopted in current U.S. TDMA (time-division multiple access) cellular/PCS (personal communications services) Interim-Standards IS-54/136 and in the European GSM (Global System for Mobile communications) standard.

Direct Sequence Spread Spectrum

Direct-sequence spread spectrum (DS-SS) is a special type of modulation scheme in which a binary data sequence is directly modulated by a spectrum spreading sequence s[n] before carrier modulation. Note that we represent binary sequences with square brackets [ ], while analog waveforms are represented with their amplitudes expressed inside curly brackets { }. Note also that modulation, i.e., multiplication, of an analog waveform c(t) with amplitude { . . . , 1, 1, −1, 1, . . . } by another waveform x(t) with amplitude { . . . , −1, 1, −1, 1, . . .} is functionally equivalent to exclusive-OR (XOR) gating a binary sequence c[n]=[ . . . 0010 . . .] with another sequence x[n]=[ . . . 1010 . . . ] when waveform amplitudes {1, −1} are mapped into binary logic [0,1]. If waveforms and their corresponding binary sequences have the same clock rate, then the resulting analog waveform v(t) and binary sequence v[n] are equivalent, i.e., $$c(t)\times x(t)=v(t)=\{\ldots, 1, 1, -1, 1, \ldots\}\times\{\ldots, 1, 1, -1, 1, \ldots\}=\{\ldots, -1, 1, 1, 1, \ldots\}$$

is equivalent to $$c[n]\oplus x[n]=v[n]=[\ldots 0010 \ldots]\oplus[\ldots 1010 \ldots]=[\ldots 1000 \ldots]$$

where the symbol $\oplus$ denotes the XOR operator.

Figure 4:
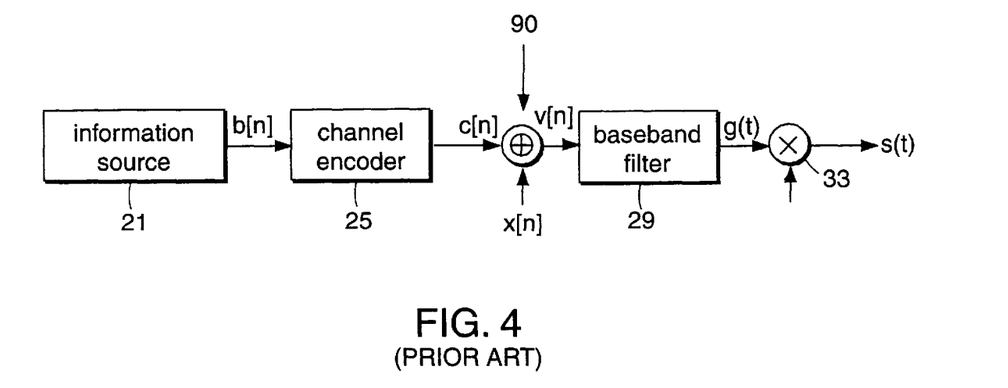
FIG. 4 is a block diagram illustrating a BPSK transmitter of a direct-sequence spread spectrum (DS-SS) system with binary spreading.

FIG. 4 is a block diagram of a BPSK-modulated DS-SS transmitter. Here, the components correspond to those of FIG. 2, with the exception that an XOR gate 90 has been inserted between the channel encoder 25 and the baseband filter 29 to mix in a spectrum spreading sequence x[n]. The output of XOR gate 90 is a spread spectrum sequence v[n]. Each bit of the spectrum spreading sequence x[n] is defined as a chip. The chip rate, is denoted by $R_c$. In general, the chip rate $R_c$, measured in chips per second, is much greater then R, i.e., $R_c>>R$. The chip interval $T_c$ is defined as $1/R_c$. The ratio of transmission bandwidth W to the coded data bit rate R is the spreading gain, SG which here is equal to W/R.

For the non-spread digital communication system of FIG. 2, R≅W and therefore SG≅1. For the DS-SS signal of FIG. 4, W>>R and, as a result, SG>>1. Since W≅$R_c$, spreading gain can also be defined as SG=$R_c$/R=T/$T_c$. For ease of implementation in practical systems, the ratio T/$T_c$ is usually an integer and is denoted by N.

Figure 5A:
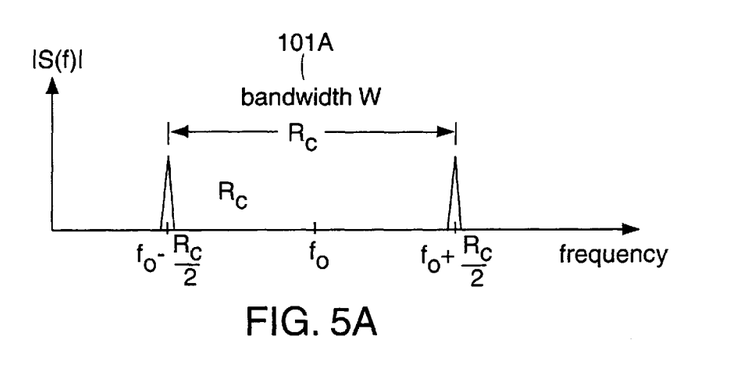
FIGS. 5A and 5B are graphs of the amplitude spectrum $|S(f)|$ versus the transmission bandwidth W of a DS-SS communication system using alternating and ideal spectrum spreading code sequences.

FIG. 5A shows the amplitude spectrum |S(f)| of s(t) for the case where a coded bit sequence c[n] of all 1s, i.e., [ . . . 1111 . . . ], is modulated, or equivalently, XORed, at XOR gate 90 with an alternating spreading sequence x[n]=[ . . . 0101 . . . ]. The spread code sequence v[n]=c[n]⊕x[n] is [ . . . 1010 . . . ].

The transmission bandwidth W 101A is equal to $R_c$, the chip rate, which is much greater than the coded bit rate R. There is no spectrum spreading because the alternating sequence has poor spectrum spreading characteristics.

Figure 5B:
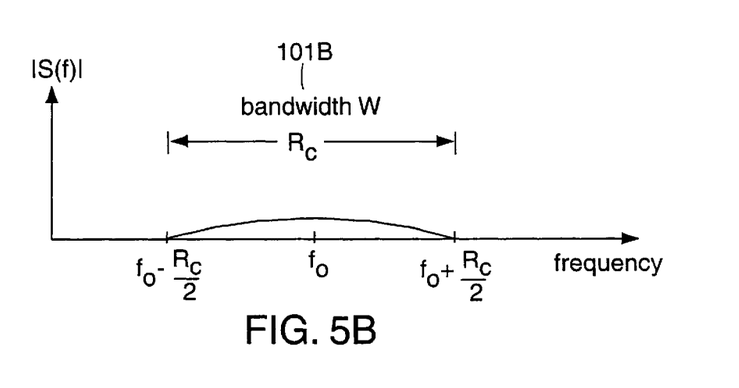

As FIG. 5B shows, in general, a random sequence is an ideal spectrum spreading code. The power spectral density (PSD), or equivalently, the amplitude spectrum |S(f)|, of s(t) is relatively flat within the transmission bandwidth W 101B. Since the same spreading code must be generated at the receiving end for despreading, a very long, i.e., much larger than the spreading gain, pseudo-random noise-like periodic code sequence, or PN sequence, is used.

In the case of quadrature spectrum spreading and QPSK modulation, two spreading sequences $s_1[n]$ and $s_2[n]$ are used for the in-phase and quadrature-phase branches respectively.

The U.S. CDMA (code-division multiple access) cellular/PCS standard IS-95 specifies a technique using BPSK modulation with quadrature spreading in which two spreading sequences $s_3[n]$ and $s_4[n]$ and BPSK modulation with in-phase and quadrature branches are used. This scheme is known as BPSK with quadrature spreading.

Received signal-to-noise power ratio is defined as SNR= $P/(N_o W)$ where P is the received power level (in watts) of a transmitted signal s(t), and $N_o W$ is the total noise power in bandwidth W. $N_o$ is the (Gaussian) noise power spectral density. Since P=E/T=ER, where E the energy per coded data bit, $$SNR=(E/N_o)\ (R/W)=(E/N_o)\ (1/SG).$$

Thus, $$PSD=P/W=E\ (R/W)=E/SG.$$

The performance of a digital communication system is measured in terms of the error rate in decoded data bits at the receiver. This error rate is inversely proportional to the (coded) bit energy E. Transmitting a coded data sequence c[n] with a spread spectrum is preferred over non-spreading for the following reasons:
1) low PSD for a fixed E results in "signal hiding"
2) wide bandwidth W (W>>R) reduces the effect of frequency selective fading
3) the advantage of diversity combining due to a higher transmission (chip) rate
4) data security by PN code sequence scrambling Direct-Sequence Code-Division Multiple Access (DS-CDMA)

In a DS-CDMA scheme, a multiple number of wireless users share a common bandwidth of W Hz with the same carrier frequency $f_o$. The coded data bits $c_i[n]$ of user i are DS-SS modulated with a distinct spreading code $x_i[n]$ assigned to that user i. A DS-CDMA forward link (cell-site) transmitter supporting K users essentially comprises K parallel DS-SS transmitter units. The DS-CDMA receiver for user i is identical to a DS-SS BPSK receiver. Since multiple users share the same bandwidth W, each user's receiver must tolerate interference from other users. That is, $s_i[n] \oplus s_j[n]$, where i≠j, is not an all-zero sequence. Consequently, a sequence received and decoded by one user will contain errors due to multiple access interference (MAI) from other users. In a cellular environment, multiple access interference is due not only to users from the same cell, but also to users from neighboring cells.

Figure 6:
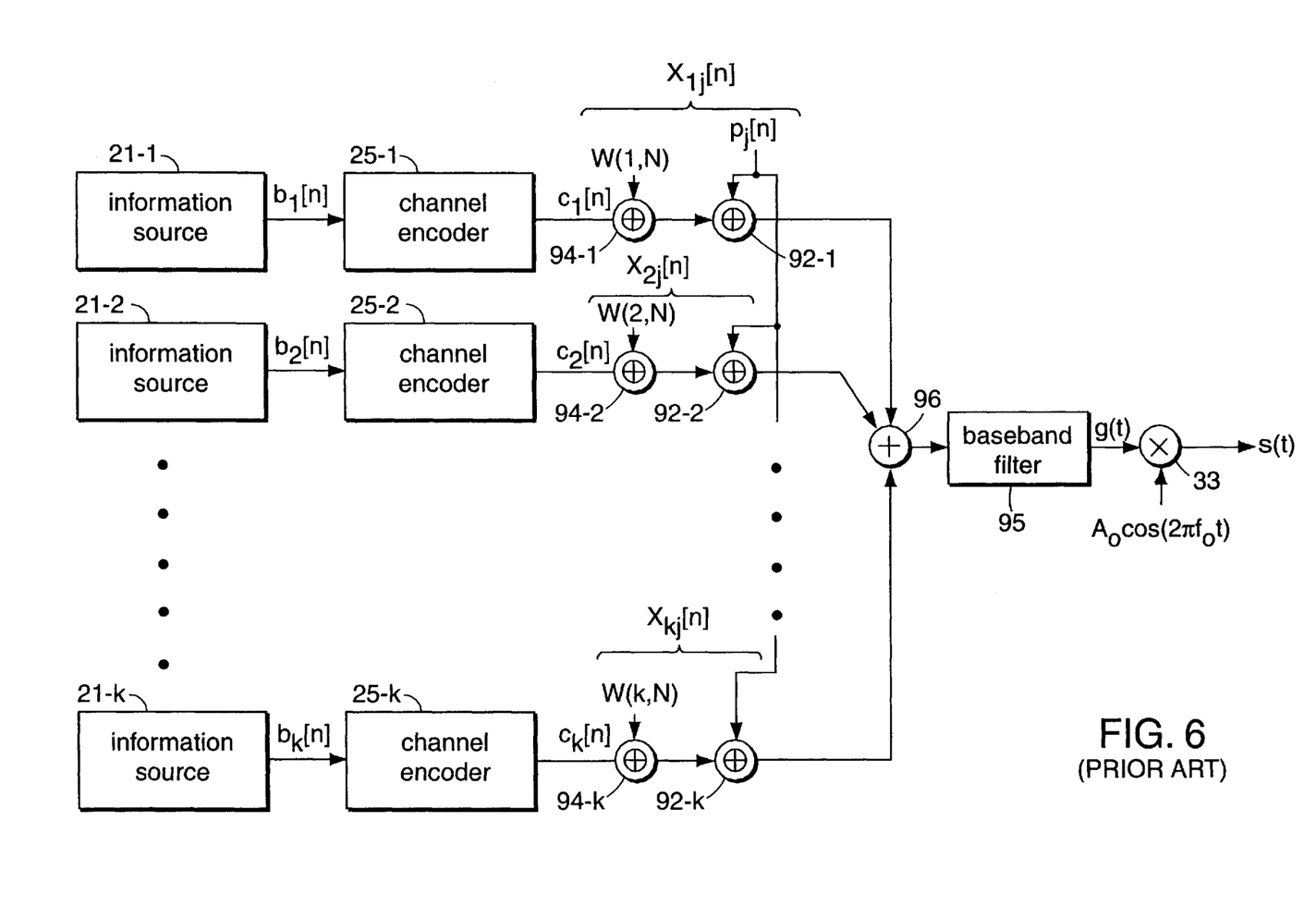
FIG. 6 is a block diagram illustrating a cell site BPSK transmitter of an IS-95 type DS-CDMA system for K mobile users.

FIG. 6 shows a cell-site transmitter based on the U.S. CDMA IS-95 standard. In this case, the spectrum spreading code $x_{ij}[n]$ of user i in cell j is a combination of two codes: a cell-specific code PN $p_j[n]$, and a user-specific code $w_i[n]$. Note that $x_{ij}[n]=p_j[n]\oplus w_i[n]$. Again, the cell-specific code sequence $p_j[n]$ is a very long (>>N) PN sequence and is generated at rate $R_p=R_c$. The user-specific codes $w_i[n]$ are preferably orthogonal Walsh codes which are generated at rate $R_w=R_c$. The repetition period N of a Walsh code is preferably equal to the spreading gain SG. For this reason, $p_j[n]$ is called a 'long' code, and $w_i[n]$ is the 'short' code. Since $w_i[n]$ is user-specific, and each user is assigned a channel, $w_i[n]$ is also known as the channelization code. The PN codes, $p_j[n]$ used primarily for spectrum spreading, are also called scrambling codes. Signals for the various users are combined by combiner 96 and are then filtered by the baseband filter 95 and modulated with the carrier at mixer 33.

An N-dimensional Walsh code is one of the N row vectors of an N-by-N Hadamard matrix. A 2-by-2 Hadamard matrix $W_2$ is shown below:

$$W_2 = \begin{pmatrix} 1 & 1 \\ 1 & 0 \end{pmatrix}$$

The two 2-dimensional Walsh codes corresponding to the two rows of the matrix are w(2,1)=[1 1] and w(2,2)=[1 0], where w(N,j) designates a Walsh code of dimention N from the j'th row of the NxN Hadamard matrix $W_N$. All Walsh codes derived from a Hadamard matrix are mutually orthogonal. The dimension, also known as the code length, is equal to its repetition period N.

Higher-dimensional Hadamard metrices can be generated recursively from a lower dimention al Hadamard matrix In general, $$W_{2N} = \begin{pmatrix} W_N & W_N \\ W_N & W_N^* \end{pmatrix}$$

where an asterisk (*) denotes the complement.

Walsh codes of dimensions 4 and 8 are illustrated below.

$$W_4 = \begin{pmatrix} 1 & 1 & 1 & 1 \\ 1 & 0 & 1 & 0 \\ 1 & 1 & 0 & 0 \\ 1 & 0 & 0 & 1 \end{pmatrix}$$

$$W_8 = \begin{pmatrix} 1 & 1 & 1 & 1 & 1 & 1 & 1 & 1 \\ 1 & 0 & 1 & 0 & 1 & 0 & 1 & 0 \\ 1 & 1 & 0 & 0 & 1 & 1 & 0 & 0 \\ 1 & 0 & 0 & 1 & 1 & 0 & 0 & 1 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \end{pmatrix}$$

For convenience, we refer to the IS-95 standard in which all users have a common information rate $R_b$, as standard CDMA (STD-CDMA).

Figure 7:
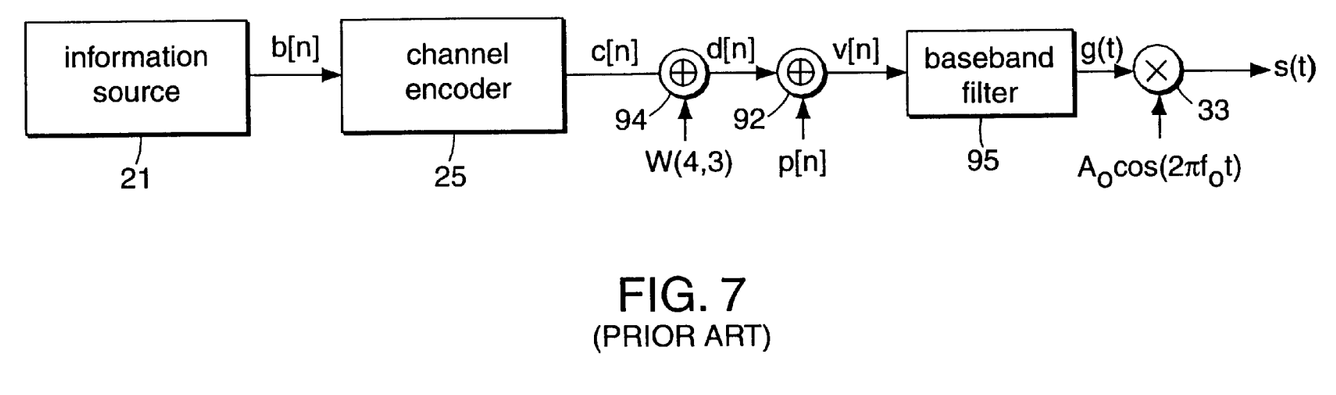
FIG. 7 is a block diagram illustrating a BPSK transmitter with binary spreading of a STD-CDMA user.

FIG. 7 is a block diagram of a STD-CDMA user transmitter. Consider, for simplicity, a STD-CDMA system with a spreading gain SG=4. Each coded bit from a sequence $c_i[n]$ from user i is mapped by the XOR gate 94 to a 4-dimensional Walsh code w(4,i) at a rate $R_w=R_c$. For example, for user 3, the sequence c[n]=[ ... 1011 ... ] is mapped to the sequence $$d[n]=[\ldots w(4,3), w'(4,3), w(4,3), w(4,3) \ldots ] = [\ldots 1100\ 0011\ 1100\ 1100 \ldots ]$$

The Walsh-coded sequence d[n] is next modulated with a PN sequence p[n] at XOR gate 92 at a rate $R_p=R_c$. Note that the spreading gain SG is $R_w/R=4$, the chip rate $R_c$ is $R_p=R_w$, the transmission bandwidth W is $R_c$, and the power density PSD is E/SG=E/4.

Now, consider again the despreading operation of user i in cell j. If an interfering user k is from the same cell as user i, e.g., cell j, then, $$s_{ij}[n] \oplus s_{kj}[n] = (p_j[n] \oplus w_i[n]) \oplus (p_j[n] \oplus w_k[n]) = w_i[n] \oplus w_k[n]$$

Because Walsh codes are orthogonal, the value of ($w_i[n] \oplus w_k[n]$) over a period of N chips or samples is zero.

If, on the other hand, the interfering user k is also from a different cell from user i, e.g., cell m, then, $$s_{ij}[n] \oplus s_{km}[n] = (p_j[n] \oplus w_i[n]) \oplus p_m[n] \oplus W_k[n]) = p_j[n] \oplus p_m[n]$$

which, over a period of N, is not equal to zero. In other words, there is a certain level of cross-correlation between two scrambling codes. Selection of PN long codes $p_j[n]$ with low cross-correlation property is crucial in reducing multiple access interference. PN codes with low autocorrelation, i.e., for non-zero time shifts, are also preferable for easy code acquisition at the receiving end.

According to the IS-95 standard, each user in a forward (base-to-mobile) link is assigned a 64-dimensional Walsh code and all users from the same cell are assigned a common cell-specific PN having a length of 32767.

Two fundamental limitations of the IS-95 standard are that every channel supports only a single low information rate of $R_b$ bps (9.6 kbps), and that the system is optimized for voice communication. Several new methods based on CDMA have been suggested to support higher information rates for non-voice communications such as Web surfing, data file transfer and other multimedia applications.

The multi-code CDMA (MC-CDMA) scheme disclosed in U.S. Pat. No. 5,442,625 to Gitlin et al provides higher user data rates by implementing a parallel combination of IS-95 CDMA traffic channels. For example, a user with a coded data rate of 2R is assigned two STD-CDMA channels. This requires multiple baseband transmitter/receiver units per user. The spreading gain SG is $R_w/R_1=R_w/R_2=4$, the chip rate $R_c$ is $R_p=R_w$, the transmission bandwidth W is $R_c$ and the power spectral density PSD is 2E/SG=E/2. The modulation scheme is no longer BPSK, because the code sequence can take on any of three values: 0, 1 and 2.

Variable spreading gain CMDA, or VSG-CDMA, disclosed in U.S. Pat. No. 5,751,761 to Gilhousen, provides higher data rates by using a lower dimensional Walsh code for Walsh mapping. For example, a user with the coded data rate 2R is assigned a Walsh code with dimension N/2. Where N=4, each bit of the sequence c[n] = [ ... 1011 ... ] is mapped to a 2-dimensional Walsh code, resulting in the sequence $$d[n]=[\ldots 10\ 01\ 10\ 10 \ldots ].$$

The Walsh-coded sequence d[n] is then modulated with a PN code p[n]. Now, the spreading gain SG is $R_w/2R=2$, the chip rate $R_c$ is $R_p=R_w$, the bandwidth W is $R_c$ and the power spectral density PSD is E/SG=E/2.

The assignment of a parent Walsh code w(2,2)[n] to a VSG-CDMA user prohibits the assignments of its derivative codes w(4,2) and w(4,4) to two STD-CDMA users. F. Adachi et al., "Tree-structured generation of orthogonal spreading codes with different lengths for forward link of DS-CDMA mobile radio," Electronic Letters, January 1997, incorporated herein by reference, have shown a simple way of setting up a modified Walsh code structure which identifies both root and parent codes of a Walsh code using a tree-structured approach to modified Walsh code generation.

For a fixed E (energy per bit), both MC-CDMA and VSG-CDMA users require twice as much energy as a STD-CDMA user. In MC-CDMA, the increase in rate is due to code aggregation of STD-CDMA Walsh codes. In VSG-CDMA, the increase in rate is due to code blocking by using a lower-dimensional (parent) Walsh code. Compared to STD-CDMA users, both MC-CDMA and VSG-CDMA users with higher transmit power, or equivalently, larger PSD, are not power transparent.

SUMMARY OF THE INVENTION

The present invention is called Variable Chip Rate Code-Division Multiple Access, or VCR-CDMA. A preferred embodiment uses direct-sequence spread spectrum modulation and distinct user code assignments to provide high-rate communications for users without giving up any standard user codes. Key applications of VCR-CDMA are in voice, data, video, Internet (Web) browsing and other multimedia services where high and low information rates can be multiplexed efficiently in a shared resource environment such as wireless networks. Although the primary use of VCR-CDMA is in wireless applications where each cell site is allocated multiple STD-CDMA frequency bands, VCR-CDMA can also be integrated into other digital systems which adopt DS-CDMA technology regardless of the physical transmission medium.

In accordance with a preferred embodiment of the present invention, a method of communicating multiple signals over a common communication link comprises modulating first input signals, for example, from a first user, with respective first spectrum spreading codes such as a combination of channelization codes and pseudo-noise (PN) codes to obtain a first set of modulated signals at a first chip rate. The input signals can be, for example, digitized audio or video signals, or computer data file signals.

A second input signal or signals, for example, from a second user, are modulated with respective second spectrum spreading codes which maintain low cross-correlation to the first spectrum spreading codes, resulting in a second set of modulated signals at a second chip rate, where there is spectral overlap between the first and second sets of modulated signals. Preferably, the second input signals are of a data rate higher than the first input signals, and the second channelization codes are of a dimension greater than the first channelization codes. Preferably, the second input signals are of a data rate which is a multiple of the data rate of the first input signals, for example, 2' for some integer l, and the second channelization codes are of a dimension which is the same multiple of the dimension of the first channelization codes. Thus, the first and second modulated signals maintain the same spreading gain.

In a preferred embodiment, the first and second channelization codes are mutually orthogonal codes such as Walsh codes of different dimensions. The first and second pseudo-noise codes preferably possess low autocorrelation and cross-correlation properties in order to maintain low mutual multiple access interference between them.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention, called Variable Chip Rate Code-Division Multiple Access, or VCR-CDMA, is a multiple access method which allows users within a CDMA network to coexist while having different transmission rates. Spectral overlap of narrow-band and wide-band CDMA users is a unique feature of VCR-CDMA. One application lies in commercial wireless networks, although VCR-CDMA can also be adapted to wireline networks with fiber, coaxial or twisted copper wire links which support direct-sequence CDMA techniques.

VCR-CDMA supports users with different information rates in such multimedia applications such speech, audio, video, text data and Internet browsing. VCR-CDMA is an enhancement and/or alternative to other proposed CDMA schemes such as Multi-Code CDMA (MC-CDMA), described in Chih-Li I et al., "IS-95 enhancements for Multimedia Services," Bell Labs Technical Journal, Autumn 1996 and Variable Spreading Gain CDMA, described in Chih-Li I and K. Sabnani, "Variable Spreading Gain CDMA with adaptive control for true packet switching wireless network," Proceedings of IEEE Vehicular Technology Conference, 1995. The present invention, VCR-CDMA, as well as the above mentioned MC-CDMA and VCG-CDMA schemes, are based on direct-sequence single carrier spread spectrum modulation, which is conceptually different from multi-carrier modulation schemes such as that described in S. Kaiser and K. Fazel, "A Flexible Spread-spectrum Multi-carrier multiple-access system for multi-media applications," Proceedings of 1997 International Symposium on Personal, Indoor and Mobile Radio Communications, v. 1, 1997 and S. Kaiser, "OFDM-CDMA versus DS-CDMA: Performance evaluation for fading channels," Proceedings of IEEE Conference on Communications, June 1995.

The forward link structures (transmission from a base site to mobile units) of IS-95 CDMA and W-CDMA systems are dimension-, or code-, limited to N, where N is the spreading gain. Thus, the total number of orthogonal channelization codes is limited to N.

VCR-CDMA, however, supports more than N forward link code channels by overlaying frequency spectra of users who are assigned channelization codes of different dimensions. Spectral overlay of narrow-band and wide-band CDMA users has been studied by I. G. Kim et al. in "Forward link capacity of spectrally overlaid narrow-band and wide-band CDMA systems," Proceedings of IEEE Vehicular Technology Conference, May 1997, and by I. G. Kim et al., in "Spectrally overlaid narrow-band and wide-band CDMA systems," IEEE Communications Letters, May 1997.

While the Kim references discuss spectral overlay of narrow-band CDMA and wide-band CDMA, they treat interference from other users as worst-case Gaussian noise, without any particular description of implementation for multimedia support. The present invention exploits the unique orthogonal, i.e., zero cross-correlation, properties of Walsh codes of different dimensions, leading to the availability of higher user data rates and increased flexibility in code channel assignments.

The present invention of CDMA overlay on CDMA differs from other proposed schemes of spectral overlay such as D. L. Schilling et al., "Broadband CDMA overlay," Proceedings of IEEE Vehicular Technology Conference, May 1993, and D. M. Grieco, "The capacity available with a broadband CDMA microcell underlay to an existing cellular microcell system," IEEE Journal on Selected Areas in Communications, May 1994, in which wide-band CDMA spectrum is overlaid on top of TDMA or FDMA spectra. Other research articles such as M. J. Karol et al., "Time-Frequency-Code Sling: Efficiently Allocating the Communications Spectrum to Multirate Users," IEEE Transactions on Vehicular Technology, November 1997, and R. Wyrwas et al., "Multiple Access options for Multimedia Wireless Systems," have analyzed the advantages and disadvantages of various multiple access schemes for multimedia services without any detailed description of implementation or communications systems design.

In CDMA schemes such as STD-CDMA, MC-CDMA, VSG-CDMA, the Walsh code rate $R_w$ and the PN code rate $R_p$ are equal, and thus defines the chip rate $R_c$. This implies that the transmission bandwidth W is the same in all cases. Both high and low rate users share the same bandwidth.

The present invention supports higher data rates for wide-band CDMA users by increasing the transmission or chip rates of those users while maintaining the same spreading gain and power spectral density of narrow-band CDMA standard rate users. For simplicity, we describe the transmission of information at a rate of 2R using VCR-CDMA where R is the data rate of a standard rate CDMA (STD-CDMA) user. The result is easily generalized to data rates kR bps, where k=2^l for some integer l. We treat only transmission in the forward link. Similar results can easily be applied to transmission in a reverse link (mobile-to-base) channel by one skilled in the art.

For the sake of simplicity, the description of the present invention hereafter assumes binary spreading, that is, a single spreading sequence $s[n]=p[n]\oplus w[n]$, and BPSK modulation. The results are easily generalized for a DS-SS system with quadrature spreading and/or modulation.

If the Walsh code assigned to some user is, say, w(4,4)= [1001] with rate $R_w=8R_b(=4R)$, then for a channel-coded bit sequence c[n] of rate 2R bps, the sequence c[n]=[ . . . 1011 . . . ] is mapped to $$d[n]=[\ldots 1001\ 0110\ 1001\ 1001 \ldots]$$

Note that the spreading gain SG is $R_w/2R=4$, the chip rate $R_c$ is $R_w$, the bandwidth $W=R_c/2$, and the power spectral density PSD is $P/(2W)=E/SG=E/4$.

Figure 8A:
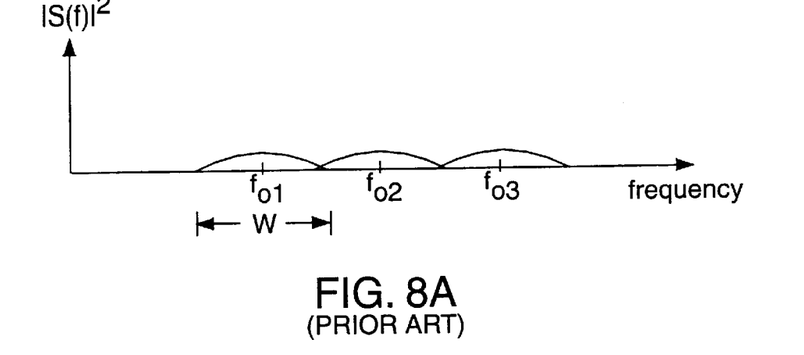
FIGS. 8A–8C are graphs of the power spectral density versus frequency which show the unique spectral overlap of VCR-CDMA users on STD-CDMA users.
Figure 8B:
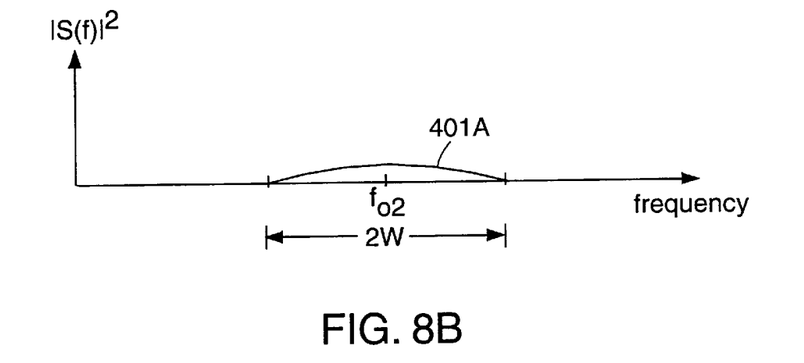
Figure 8C:
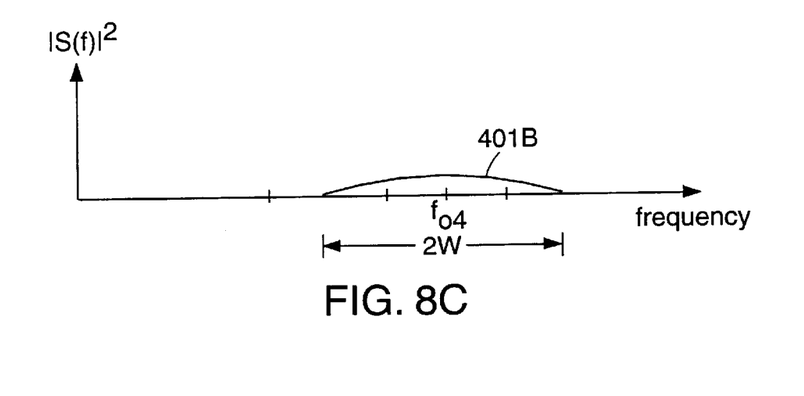

FIGS. 8A–8C demonstrate this unique arrangement of VCR-CDMA where the power spectral density PSD of a VCR-CDMA user 'overlays' on top of the power spectra of STD-CDMA users. FIG. 8A shows the non-overlapping spectra for three STD-CDMA users having respective carriers at $f_{o1}$, $f_{o2}$ and $f_{o3}$. In FIG. 8B, a VCR-CDMA user is BPSK-modulated with a carrier frequency $f_{o2}$, which is the same as one of the carriers of STD-CDMA users. In FIG. 8C, a VCR-CDMA user's carrier $f_{o4}$ is at a mid-point between two STD-CDMA carriers, $f_{o2}$ and $f_{o3}$. Either approach can be used in the present invention's implementation of spectral overlay.

Figure 9A:
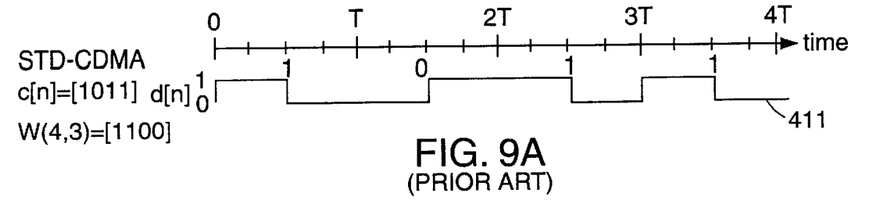
FIGS. 9A–9D are timing diagrams comparing Walsh coded sequences using various CDMA schemes.

FIGS. 9A–9D are timing diagrams which compare the resulting Walsh coded sequence d[n] for STD-CDMA, MC-CDMA, VSG-CDMA and VSR-CDMA respectively. FIG. 9A shows the timing diagram 411 of a resulting Walsh-coded sequence d[n] for a STD-CDMA user transmitting four coded data bits [1011] at a rate R, using a 4-dimensional Walsh code, e.g., w(4,3).

Figure 9B:
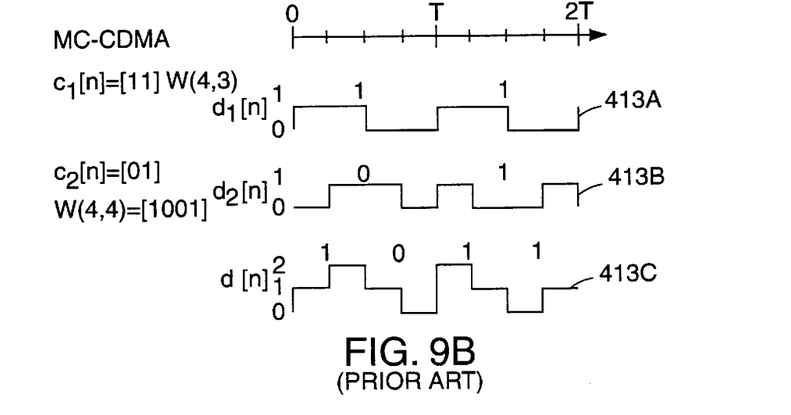

FIG. 9B shows the timing diagram for a Walsh-coded sequence for the same coded bits [1011] but at twice the rate (2R bps) using MC-CDMA. In MC-CDMA, two channels are needed to double the rate. The timing diagram indicated by 413A shows the sequence $d_1[n]$ resulting from Walsh coding the odd bits of the coded sequnence c[n], i.e., [11], using Walsh code w(4,3). Similarly, the timing diagram indicated by 413B shows the sequence d2[n] resulting from Walsh coding the even bits of c[n] using a different Walsh code, e.b., w(4,4). The final sequence d[n] 413C is the result of adding together sequences $d_1[n]$ and $d_2[n]$. Note that d[n] can take on three values: 0, 1 and 2.

Figure 9C:
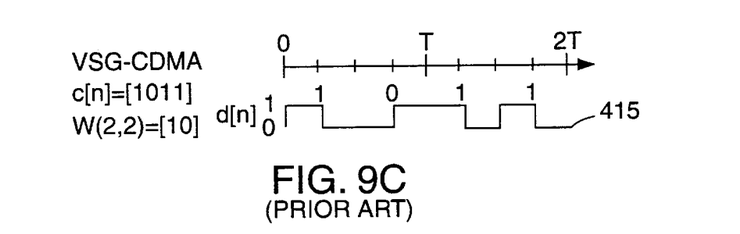

FIG. 9C shows the timing diagram 415 for a Walsh-coded sequence using VSG-CDMA with a N/2-dimensional Walsh code, which in this example is N/2=2.

Figure 9D:
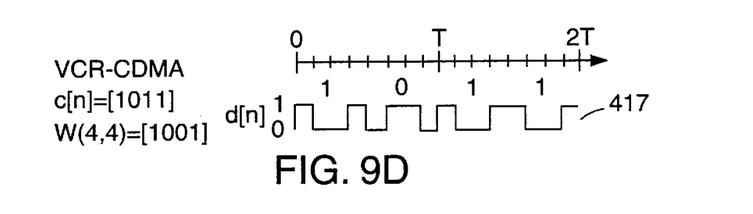

Finally, FIG. 9D shows the timing diagram 417 for a Walsh-coded sequence produced by the present VCR-CDMA invention.

These latter schemes (FIGS. 9B–9D) take only half the amount of time (2T) to transmit [1011] compared to the duration (4T) of a STD-CDMA user.

The same PN code p[n] used for STD-CDMA user may be used with a rate $R_p=(R_w/2)$, or a new PN code q[n] may be used with rate $R_q=2R_p=R_w$. Since the chip rate $R_c$ is defined as the maximum of the Walsh code rate $R_w$ and the PN code rate, the chip rate equals the Walsh rate, e.g., $R_c=R_w$, regardless of the rate of the selected PN code.

Table 1 compares key parameters of the present invention (VCR-CDMA) and other CDMA schemes.

TABLE 1

| CDMA scheme | data rate | SG | $R_c$ | $R_w$ | $R_p$ | bandwidth | PSD |
|---|---|---|---|---|---|---|---|
| STD-CDMA | R | 4 | 4R | 4R | 4R | W | E/4 |
| MC-CDMA | 2R | 4 | 4R | 4R | 4R | W | E/2 |
| VSG-CDMA | 2R | 2 | 4R | 4R | 4R | W | E/2 |
| VCR-CDMA | 2R | 4 | 8R | 8R | 4R or 8R | 2W | E/4 |

A key distinction between VCR-CDMA and other proposed CDMA schemes such as MC-CDMA and VSG-CDMA is that higher data rate, e.g., 2R bps, VCR-CDMA users can coexist with low data rate, e.g., R bps, STD-CDMA users using spectral overlay. None of the STD-CDMA Walsh code channels, of which there are four in our example, are acquired as in MC-CDMA or blocked as in VSG-CDMA. By applying VCR-CDMA on top of STD-CDMA, there is no loss in STD-CDMA code channels. Unlike MC-CDMA and VSG-CDMA, the power spectral densities of a VCR-CDMA user and STD-CDMA user are equal. This is due to the fact that, for example, a 2R bps VCR-CDMA user spreads its transmit power 2P (watts) over a wider bandwidth of 2W Hz. Unlike VSG-CDMA, the spreading gain, or equivalently, the Walsh mapping, of VCR-CDMA and STD-CDMA are equal. Thus, relative to STD-CDMA users, VCR-CDMA users are power transparent.

There is, however, a restriction as to which 4-dimensional Walsh codes can be used for Walsh mapping. Before discussing code restriction in VCR-CDMA, we revisit the topic of Walsh code generation.

We have shown that a higher-dimensional Hadamard matrix can be generated recursively from a lower-dimensional Hadamard matrix. Equivalently, a higher dimensional Walsh code can be generated from a lower dimensional Walsh code. For k=1 to N, $$w(2N, k)=[w(N, k)\ w(N,k)]$$
$$w(2N, N+k)=[w(N, k)\ w^*(N,k)].$$

Thus, for example, 8-dimensional Walsh codes (of code length 8) can be generated by concatenating two 4-dimensional Walsh codes (of code length 4), or a 4-dimensional Walsh code and its complement.

Figure 10:
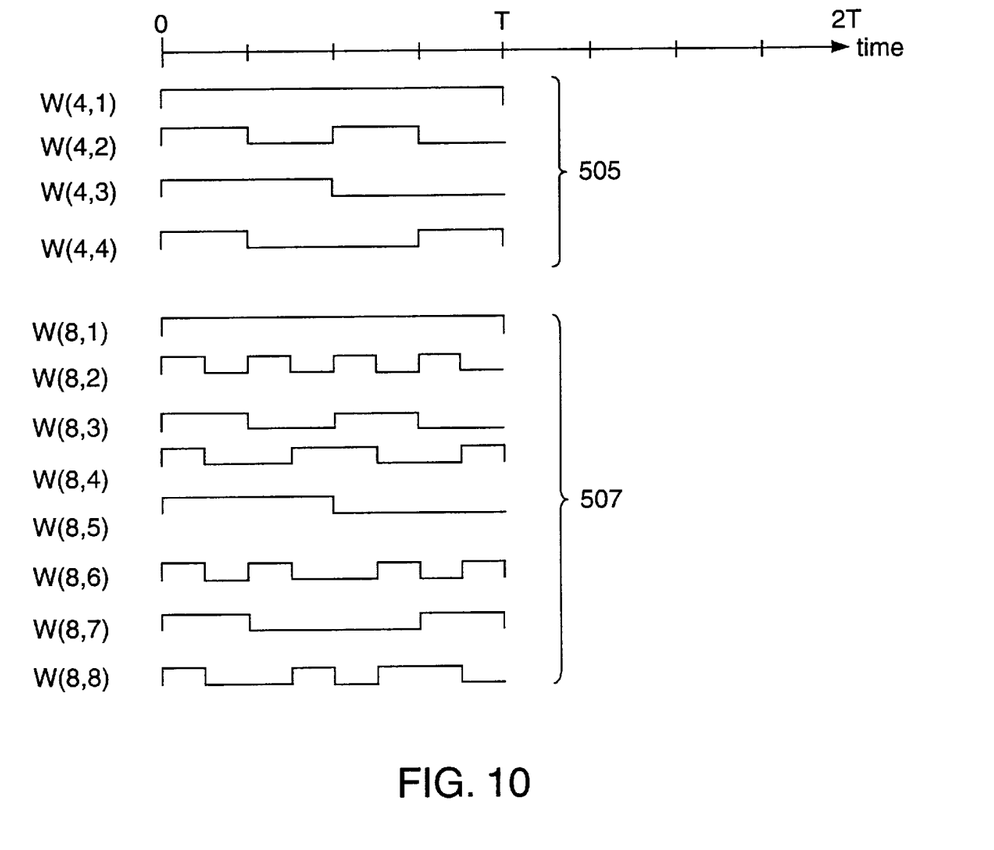
FIG. 10 shows timing diagrams of 4 and 8 dimensional Walsh codes generated in the same time interval.

FIG. 10 compares timing diagrams of 4-dimensional Walsh codes 505 with 8-dimentional Walsh codes 507 generated within the same time period T. These diagrams show that if 8-dimensional Walsh codes are generated at twice the rate of 4-dimensional Walsh codes, then $$w(8, 2j-1)=w(4, j)\ j=1,2,3,4$$

where the odd rows of $W_8$507 are equivalent to all rows of $W_4$505.

For a 2R bps VCR-CDMA user, two w(4,k) codes are stuffed into the same time interval T as one w(4,j) code of R bps STD-CDMA user. Depending on the coded data bit of a VCR-CDMA user, possible Walsh code sequences during an interval of T seconds are:

$w(8, k) = [w(4, k), w(4, k)]$  for $c[n] = [11]$ $w(8, k + 4) = [w(4, k), w^*(4, k)]$  for $c[n] = [10]$ $w^*(8, k + 4) = [w^*(4, k), w(4, k)]$  for $c[n] = [01]$ $w^*(8, k) = [w^*(4, k), w^*(4, k)]$  for $c[n] = [11]$ for $k = 1, 2, 3, 4$.

While a STD-CDMA transmitter maps each coded data bit to its assigned Walsh code w(4,j) in T seconds, a VCR-CDMA transmitter maps each coded data bit to its assigned Walsh code w(4,k) in T/2 seconds. Equivalently, for VCR-CDMA, two coded data bits are together mapped into one of the two Walsh codes, w(8,k) or w(8,k+4), by the relation shown above. The restriction in selecting w(8,k) is that k must be an even integer. In the same time interval T, VCR-CDMA users transmit higher-dimensional Walsh codes (eight dimensions in this case) and STD-CDMA users transmit lower-dimensional Walsh codes (four dimensions in this case).

Figure 11A:
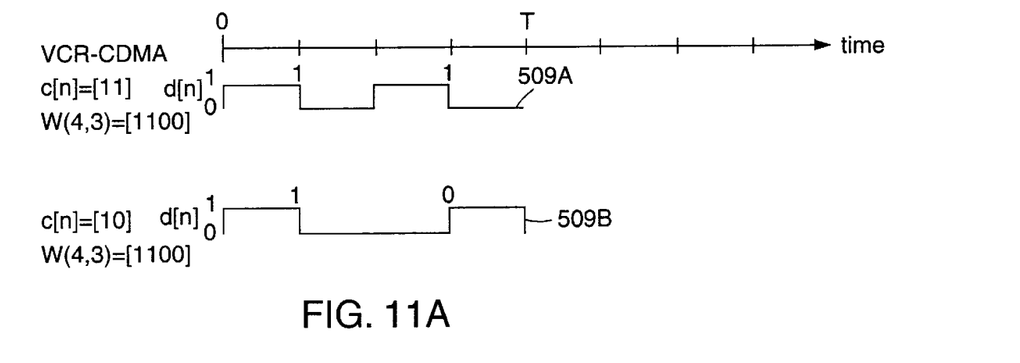
FIGS. 11A and 11B are timing diagrams of Walsh coded sequences illustrating the restriction on Walsh code assignments for VCR-CDMA users.

Consider the same example but where the user is assigned the Walsh code w(4,3)=[1100]. The timing diagram of FIG. 11A shows, for a rate 2R VCR-CDMA user, sequence d[n] 509A, 509B corresponding to the coded sequences c[n]=[ . . . 11 . . . ] and c[n]=[ . . . 10 . . . ] respectivley.

Figure 11B:
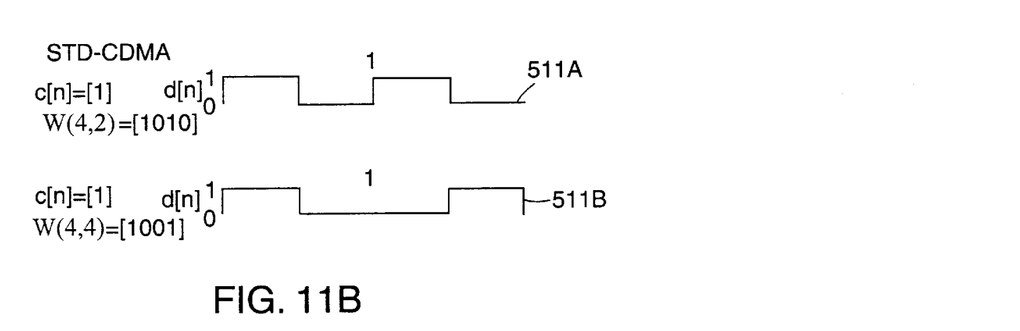

For comparison, FIG. 11B shows the timing diagrams of the Walsh-coded sequences 511A and 511B for two STD-CDMA users who are assigned Walsh codes w(4,2) and w(4,4) respectively, each transmitting c[n]=[ . . . 1 . . . ]). If the VCR-CDMA and STD-CDMA users' sequences of FIGS. 11A and 11B are modulated by the same PN code p[n], they are not distinguishable. Thus, the selection of codes is restricted to the even numbered higher dimensional codes.

On the other hand, if a new PN code q[n] (of rate $2R_p$) is used to modulate a VCR-CDMA user's sequence (and a slower PN code rate $R_p$ for STD-CDMA users), then no Walsh code restriction is necessary.

For a spreading gain of SG=4, the total number of 2R bps VCR-CDMA code channels is 2. Each VCR-CDMA user is assigned two 8-dimensional Walsh codes. In general, if a STD-CDMA with rate R uses Walsh code w(N,j) where the spreading gain SG is N, then a VCR-CDMA user with rate kR bps (with SG=N) is assigned a total of k w(kN, m) Walsh codes, where m is an even integer. Thus, the total number of VCR-CDMA users that can be supported with rate kR bps is kN/(2k)=N/2.

VCR-CDMA is backward compatible to current and emerging CDMA standards such as IS-95, cdma2000 (proposed by Qualcomm Incorporated of San Diego, Calif.) and Wide-band CDMA (W-CDMA), now being standardized at the International Telecommunications Union ITU. Thus, VCR-CDMA users with higher information rates can coexist with STD-CDMA users. VCR-CDMA can also be combined with MC-CDMA, VSG-CDMA and other pertinent schemes for further enhancements in data rates and increased flexibility in code channel assignments.

For example, coded bit rate of 4R can be achieved by combining two parallel VCR-CDMA channels using MC-CDMA techniques. Users with rate 4R can also be supported by combining the VCR-CDMA and VSG-CDMA schemes. For example, for a channel coded bit sequence c[n] of rate 4R, with an assigned Walsh code w(2,2)=[10] at rate $R_w=8R$, if c[n]=[ . . . 1011 . . .], then d[n]=[ . . . 1001 1010 . . . ]

Here, the spreading gain is SG is $R_w/4R=2$, the chip rate is $R_c$ is $R_w$, the PN rate $R_q$ is $R_c$, the bandwidth W is $R_c/2$ and the power spectral density PSD=P/(2W)=E/SG=E/2. Table 2 compares key parameters of this combined scheme (VSG-CDMA+VCR-CDMA) with other CDMA schemes.

TABLE 2

| CDMA scheme | data rate | SG | $R_c$ | $R_w$ | $R_p$ | bandwidth | PSD |
| --- | --- | --- | --- | --- | --- | --- | --- |
| VSG + VCR | 4R | 2 | 8R | 8R | 4R or 8R | 2W | E/2 |
| MC + VCR | 4R | 4 | 8R | 8R | 4R or 8R | 2W | E/2 |
| VCR-CDMA | 2R | 4 | 8R | 8R | 4R or 8R | 2W | E/4 |
| VSG-CDMA | 2R | 2 | 4R | 4R | 4R | W | E/2 |

Figure 12A:
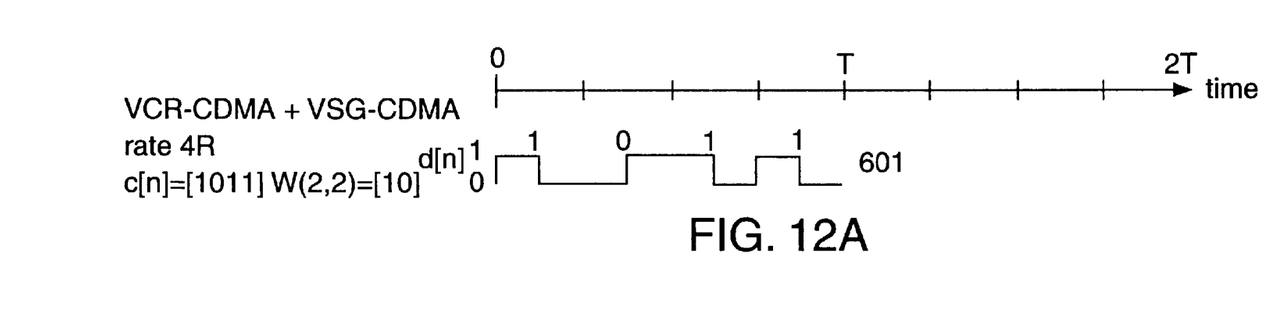
FIGS. 12A–12C are timing diagrams of Walsh coded sequences using a combination of VCR-CDMA and VSG-CDMA, VSG-CDMA and VCR-CDMA schemes.
Figure 12B:
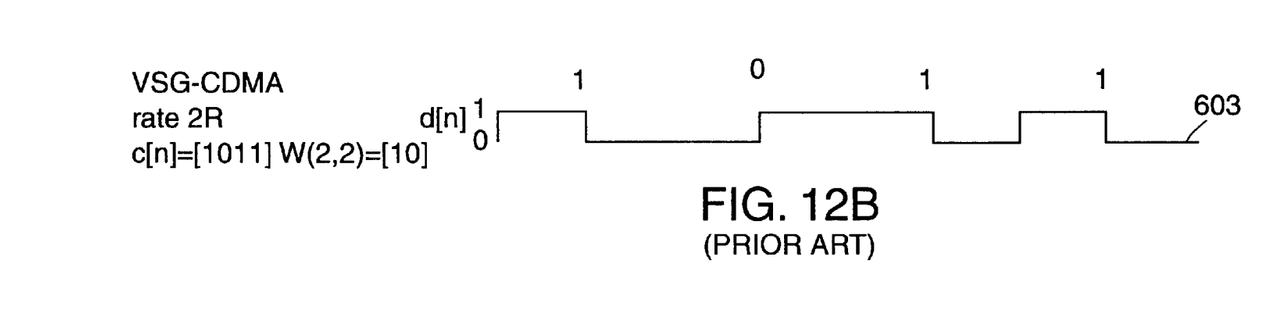
Figure 12C:
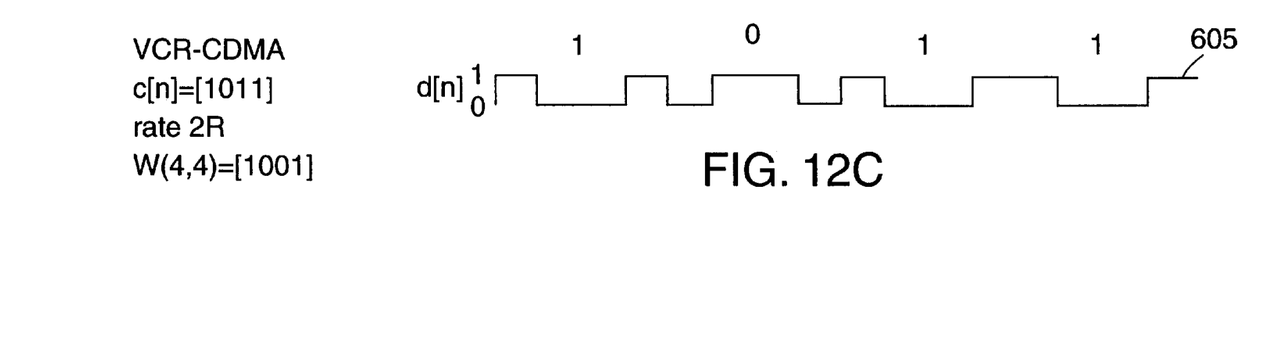

The selection of a lower-dimensional Walsh code w(2,2) is due to VSG-CDMA, while use of a higher Walsh code rate $R_w$ is a VCR-CDMA conception. FIGS. 12A–12C compare the timing diagrams of three cases of Walsh coded sequences d[n] corresponding to VCR-CDMA+VSG-CDMA, VSG-CDMA and VCR-CDMA, respectively. The timing diagram 601 of FIG. 12A is of a Walsh-coded sequence for coded data bits [1011] at a rate of 4R. FIGS. 12B and 12C shows timing diagrams 603, 605 for rate 2R users using the VSG-CDMA and VCR-CDMA schemes, respectively.

Figure 13:
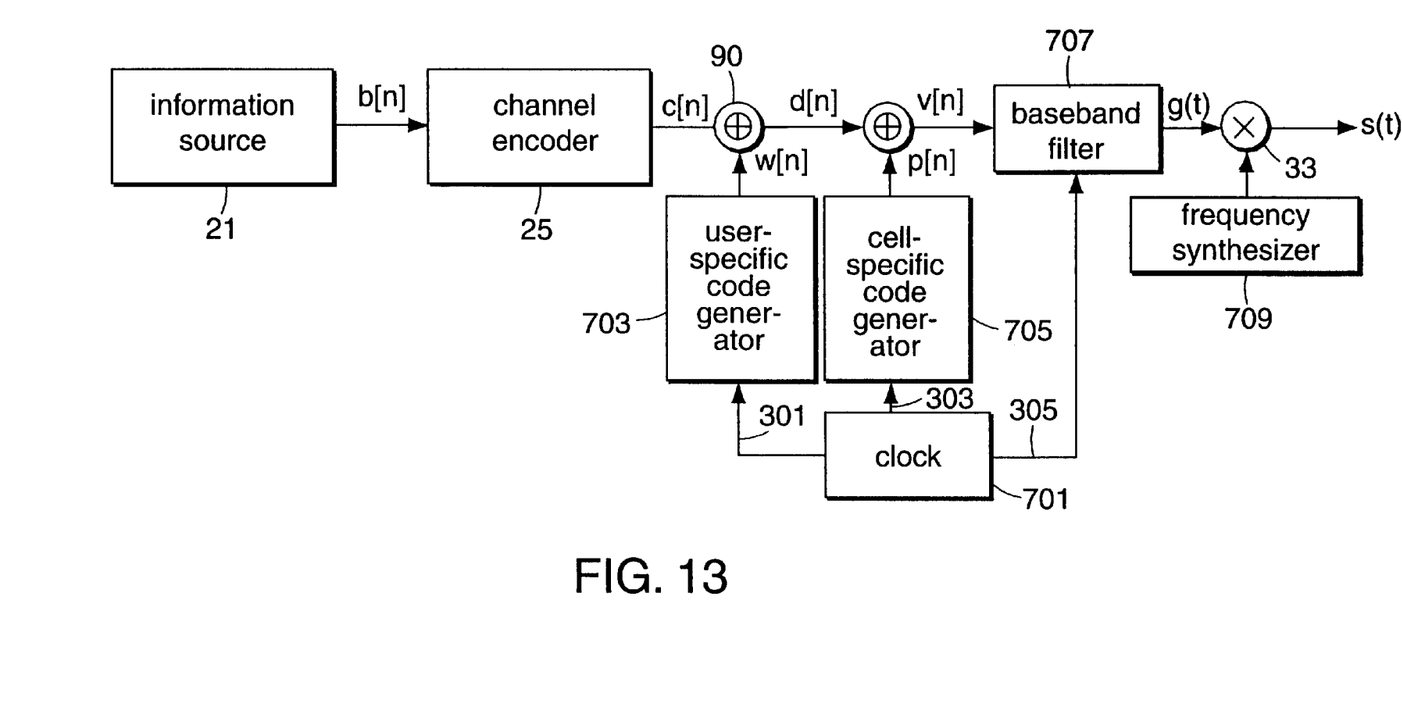
FIG. 13 is a block diagram illustrating a preferred embodiment of the present invention's VCR-CDMA transmitter supporting multiple information data rates.

FIG. 13 is a block diagram of a cell-site transmitter for a VCR-CDMA user of rate kR. The information source 21, channel encoder 25 and modulator 33 correspond to those shown in FIG. 2. The user-specific code generator 703 outputs N-dimensional Walsh codes at the rate SG×(kR), which is controlled by the clock signal 301 supplied by a clock 701. This is effectively the same as generating kN-dimensional Walsh codes in the same time interval.

The same PN code as used in STD-CDMA may be chosen, or optionally a new PN code of rate SG×(kR) may be used. Cell-specific code generator 705 generates a cell-specific PN code at a clock rate 303 supplied by the clock 701. While in other CDMA schemes both clock rates are the same, in the present invention the PN clock signal 303 and the Walsh clock signal 301 can be at different rates.

As discussed with reference to FIG. 8, the RF carrier $f_o$ can be the same as those of STD-CDMA users, or at a mid-point between them. While all transmitters in general have a frequency synthesizer for carrier frequency selection, the frequency synthesizer 709 of a preferred embodiment of the present invention must support a wider range of carrier frequencies in order to provide both high and low data rate transmissions.

The baseband pulse-shaping filter 707 converts a binary digital sequence into continuous-time waveforms which are modulated at mixer 33 by a radio frequency (RF) carrier signal generated by the frequency synthesizer 709. The clock 701 feeds a timing signal 305 having a rate equal to the chip rate to the baseband filter 707 so that the binary sequence v[n] is converted accurately into a baseband analog waveform g(t). Of course, a higher data rate is possible by including a VSG-CDMA scheme, i.e. by using a lower-dimensional Walsh code. This is accomplished by selecting a lower dimensional Walsh code to be generated by the user-specific code generator 703.

The functional blocks of a reverse-link mobile transmitter of a rate kR VCR-CDMA user can be designed similarly. In this case, the user-specific code generator 703 produces a user-specific PN code. The clock 701, cell-specific code generator 705, baseband filter 707 and frequency synthesizer 709 remain unchanged. The channel encoder 25 can be modified accordingly.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of communicating multiple signals over a common communications link comprising:

modulating first input signals with respective first codes of low cross-correlation to obtain a first set of modulated signals at a first chip rate, each first modulated signal having a first bandwidth; and modulating second input signals with respective second codes of low cross correlation relative to each other and relative to the first codes to obtain a second set of modulated signals at a second chip rate, different from said first chip rate each second modulated signal having a second bandwidth, there being spectral overlap between the first and second sets of modulated signals.

2. A method as claimed in claim 1 further comprising modulating each of the first and second sets of modulated signals with different noise signals to spread the spectrum of each, wherein the different noise signals are at a data rate which is different from at least one of the chip rates.

3. A method as claimed in claim 2 wherein the second input signals, having a data rate higher than the first input signals, are modulated with the second codes, the second codes being of a dimension greater than the first codes.

4. A method as claimed in claim 3 wherein the second input signals are of a data rate which is a multiple of the data rate of the first input signals and the second codes are of a dimension which is the same multiple of the dimension of the first codes.

5. A method as claimed in claim 2 wherein the first and second codes are Walsh codes of different dimensions.

6. A method as claimed in claim 5 wherein the second input signals, having a data rate higher than the first input signals, are modulated with the second codes, the second codes being of a dimension greater than the first codes.

7. A method as claimed in claim 6 wherein the second input signals are of a data rate which is a multiple of the data rate of the first input signals and the second codes are of a dimension which is the same multiple of the dimension of the first codes.

8. A method as claimed in claim 1 wherein the second input signals, having a data rate higher than the first input signals, are modulated with the second codes, the second codes being of a dimension greater than the first codes.

9. A method as claimed in claim 8 wherein the second input signals are of a data rate which is a multiple of the data rate of the first input signals and the second codes are of a dimension which is the same multiple of the dimension of the first codes.

10. A method as claimed in claim 1 wherein the first and second codes are Walsh codes of different dimensions.

11. A method as claimed in claim 10 wherein the second input signals having a data rate higher than the first input signals, are modulated with the second codes, the second codes being of a dimension greater than the first codes.

12. A method as claimed in claim 11 wherein the second input signals are of a data rate which is a multiple of the data rate of the first input signals and the second codes are of a dimension which is the same multiple of the dimension of the first codes.

13. The method of claim 1 wherein the communication link comprises a cellular network link.

14. The method of claim 1 wherein the communication link is a wireline network link.

15. The method of claim 1 wherein the communication link is an optical fiber link.

16. The method of claim 1 wherein the communication link is a coaxial cable link.

17. The method of claim 1 wherein the communication link is a twisted copper wire link.

18. The method of claim 1 wherein at least one signal is a speech signal.

19. The method of claim 1 wherein at least one signal is an audio signal.

20. The method of claim 1 wherein at least one signal is a video signal.

21. The method of claim 1 wherein at least one signal comprises text data.

22. An apparatus for communicating multiple signals over a common communications link comprising:

a first modulation means for modulating first input signals with respective first codes of low cross-correlation to obtain a first set of modulated signals at a first chip rate, each first modulated signal having a first bandwidth; and a second modulation means for modulating second input signals with respective second codes of low cross correlation relative to each other and relative to the first codes to obtain a second set of modulated signals at a second chip rate, different from said first chip rate each second modulated signal having a second bandwidth, there being spectral overlap between the first and second sets of modulated signals.

23. The apparatus of claim 22 wherein each of the first and second input signals is modulated with different noise signals to spread the spectrum of each, wherein the different noise signals are at a data rate which is different from at least one of the chip rates.

24. The apparatus of claim 23 wherein the second input signals are of a data rate which is a multiple of the data rate of the first input signals and the second codes are of a dimension which is the same multiple of the dimension of the first codes.

25. The apparatus of claim 23 wherein the first and second codes are Walsh codes of different dimensions.

26. A transmitter for transmitting multiple signals over a common communications link comprising:

a modulator for combining first input signals with respective first codes of low cross-correlation to obtain a first set of modulated signals at a first chip rate, each first modulated signal having a first bandwidth, and for combining second input signals with respective second codes of low cross correlation relative to each other and relative to the first codes to obtain a second set of modulated signals at a second chip rate, different from said chip rate, each second modulated signal having a second bandwidth, there being spectral overlap between the first and second sets of modulated signals; and a link interface for transmitting the modulated signals over the communications link.

27. The transmitter of claim 26 further comprising:

a second modulator for combining each of the first and second sets of modulated signals with different noise signals to spread the spectrum of each, wherein the different noise signals are at a data rate which is different from at least one of the chip rates.

28. The transmitter of claim 27 wherein the second input signals, having a data rate higher than the first input signals, are modulated with the second codes, the second codes being of a dimension greater than the first codes.

29. The transmitter of claim 28 wherein the second input signals are of a data rate which is a multiple of the data rate of the first input signals and the second codes are of a dimension which is the same multiple of the dimension of the first codes.

30. The transmitter of claim 27 further comprising:
a Walsh code generator, wherein the first and second codes are Walsh codes of different dimensions generated by the Walsh code generator.

31. The transmitter of claim 30 wherein the second input signals, having a data rate higher than the first input signals, are modulated with the second codes, the second codes being of a dimension greater than the first codes.

32. The transmitter of claim 31 wherein the second input signals are of a data rate which is a multiple of the data rate of the first input signals and the second codes are of a dimension which is the same multiple of the dimension of the first codes.

33. The transmitter of claim 27, further comprising:
a pseudo-random noise (PN) generator for generating the different noise signals.

34. The transmitter of claim 33 further comprising:
a PN selector for selecting a particular PN sequence.

35. The transmitter of claim 34, further comprising:
a local oscillator for clocking the PN generator for controlling a chip rate of a PN sequence generated by the PN generator.

36. The transmitter of claim 26 wherein the second input signals, having a data rate higher than the first input signals, are modulated with the second codes. the second codes being of a dimension greater than the first codes.

37. The transmitter of claim 36 wherein the second input signals are of a data rate which is a multiple of the data rate of the first input signals and the second codes are of a dimension which is the same multiple of the dimension of the first codes.

38. The transmitter of claim 26 wherein the first and second codes are Walsh codes of different dimensions.

39. The transmitter of claim 38 wherein the second input signals, having a data rate higher than the first input signals, are modulated with the second codes, the second codes being of a dimension greater than the first codes.

40. The transmitter of claim 39 wherein the second input signals are of a data rate which is a multiple of the data rate of the first input signals and the second codes are of a dimension which is the same multiple of the dimension of the first codes.

41. A system for transmitting and receiving multiple signals over a common communications link comprising:

a modulator for combining first input signals with respective first codes of low cross-correlation to obtain a first set of modulated signals at a first chip rate, each first modulated signal having a first bandwidth, and for combining second input signals with respective second codes of low cross correlation relative to each other and relative to the first codes to obtain a second set of modulated signals at a second chip rate, different from said first chip rate, each second modulted signal having a second bandwidth, there being spectral overlap between the first and second sets of modulated signals;

a link interface for transmitting the modulated signals over the communications link, and for receiving modulated signals from the communications link;

a first demodulator for combining the received signals with the first codes to obtain a first set of demodulated signals at a first data rate; and a second demodulator for combining the received signals with the second codes to obtain a second set of demodulated signals at a second data rate.

* * * * *